United States Patent [19]

Caison

[11] Patent Number: 4,788,383
[45] Date of Patent: Nov. 29, 1988

[54] ELECTRICAL JUNCTION BOX FOR SUPPORT OF A HANGING APPLIANCE

[75] Inventor: Gregory W. Caison, Fayetteville, N.C.

[73] Assignee: Fasco Industries, Inc., Lake Forest, Ill.

[21] Appl. No.: 93,699

[22] Filed: Sep. 8, 1987

[51] Int. Cl.[4] .............................................. H02G 3/20
[52] U.S. Cl. ......................................... 174/54; 174/48; 248/343; 248/DIG. 6
[58] Field of Search ................ 174/48, 53, 54, 61–64; 248/57, 343, DIG. 6

[56] References Cited

U.S. PATENT DOCUMENTS

| 1,537,780 | 5/1925 | Oefinger | 174/54 |
| 2,671,821 | 3/1954 | Zientowski et al. | 174/54 |
| 4,538,786 | 9/1985 | Manning | 248/57 |
| 4,684,092 | 8/1987 | Reiker | 248/200.1 |

Primary Examiner—Arthur T. Grimley
Assistant Examiner—David A. Tone
Attorney, Agent, or Firm—Shlesinger Fitzsimmons Shlesinger

[57] ABSTRACT

An electrical junction box for supporting a hanging load includes a base plate and a sidewall extending from it. The base plate has a pair of square bolts holes at opposite positions next to the sidewall. The sidewall has a pair of tabs bent inward, each tab having a bolt hole aligned with one of the square bolt holes. A square necked carriage bolt extends through each square bolt hole and its aligned tab bolt hole, with a lock nut on each of the bolts for supporting the hanging load. A spacer sleeve surrounds each of the bolts, between the base plate and the tabs, forming a rigid structure when the nuts are tightened. The sidewall further includes mounting holes for side mounting of the junction box for a supporting structure, permitting flush mounting of the box relative to a ceiling.

10 Claims, 1 Drawing Sheet

ELECTRICAL JUNCTION BOX FOR SUPPORT OF A HANGING APPLIANCE

BACKGROUND OF THE INVENTION

This invention relates to an electrical junction box providing mechanical support and electrical connection to a hanging appliance such as a ceiling fan or lighting fixture.

Typically in the prior art, ceiling junction boxes are fastened to supporting structure by fasteners inserted vertically into the supporting structure, and a hanging appliance is suspended from the junction box by vertical screw fasteners threaded into tabs bent inwardly from the depending sidewalls of the box. Inherently in such an arrangement, the junction box is not flush with the supporting structure but hangs below it; and the threaded tabs, being typically about 1/16th inch thick, provide limited structural strength to the screw fastening of a hanging appliance.

In 1987, the National Electrical Code was amended to prohibit the use of a standard electrical junction box as the sole support of a ceiling fan. Junction boxes must henceforward be specifically designed and approved for that purpose.

It is an object of this invention, therefore, to provide an electrical ceiling junction box which is suitable both for flush mounting relative to a ceiling and for improved structural strength and integrity for mounting a hanging appliance.

SUMMARY OF THE INVENTION

Briefly, the invention may be summarized as: an electrical junction box for supporting a hanging load and including a base plate having adjacent opposite side edges thereof a pair of bolt holes, a sidewall integral with and projecting downwardly from the periphery of the base plate and containing holes for side mounting of the box on a supporting structure, a pair of opposed tabs projecting inwardly of said sidewall adjacent its lower edge, each tab having a tab bolt hole in alignment with one of the base plate bolt holes, a carriage bolt extending through each base plate bolt hole and its aligned tab bolt hole, and a lock nut on each bolt for securing a hanger bracket to the bottom of the box. A spacer sleeve may surround each bolt, between the base plate and tab, to form a rigid structure, and the carriage bolts may have square or ribbed necks seated in correspondingly shaped bolt holes in the base plate to prevent rotation of the bolts relative to the plate.

DESCRIPTION OF THE PREFERRED EMBODIMENT

Figure 1:
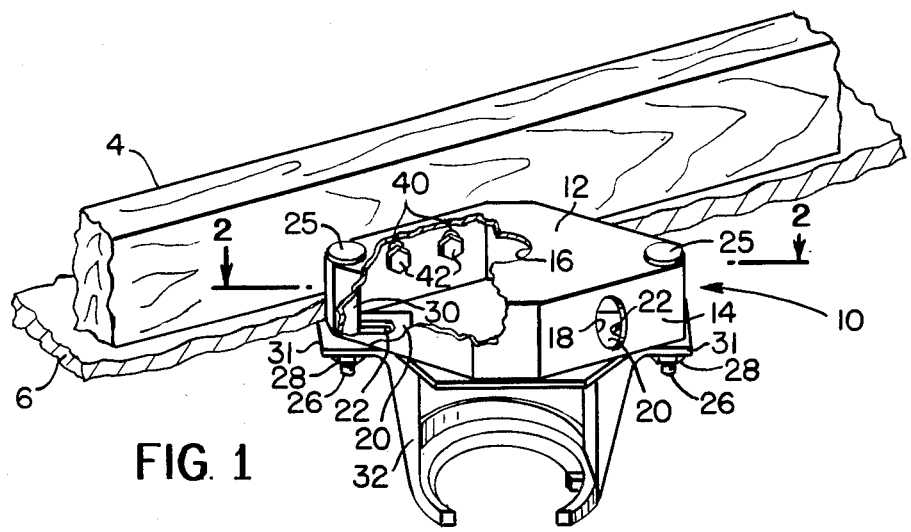
FIG. 1 is a fragmentary perspective view of an electrical junction box of the present invention shown mounted on a ceiling and joist, and including a bracket for suspending an appliance from the box.

Referring now to FIG. 1, a ceiling joist 4 and ceiling 6 are shown representing the environment and mounting support for the electrical junction box of this invention, generally represented at 10. Junction box 10 is formed of a single piece and includes a base plate 12 and a peripheral depending sidewall 14, the plate and sidewall together forming a box or space to make appropriate connections among incoming electrical wires. The base plate 12 includes a central aperture 16 for conduit or wiring, and the sidewall may include a plurality of conduit or wire apertures 18 appropriately spaced around its periphery. Where mention is made of conduit apertures or of other apertures in the junction box, it is to be understood to include those partially blanked apertures in which a blank disk remains to be knocked out to open an aperture for use. Such is the standard finished form of junction boxes as manufactured. The structure thus far described is well known and typical of the prior art.

Figure 2:
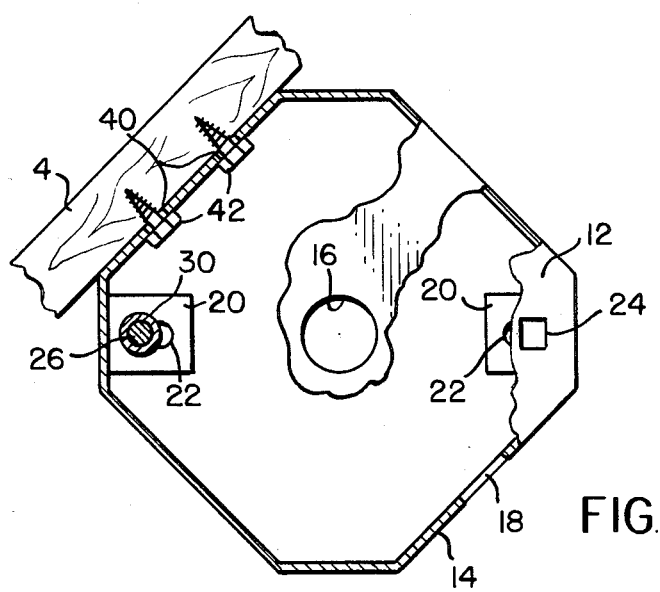
FIG. 2 is a cross sectional view taken generally along the line 2—2 in FIG. 1 looking in the direction of the arrows.

As shown in FIG. 2, the sidewall 14 includes, at opposite locations on its periphery, a pair of inwardly extending tabs 20. These tabs are part of the same sheet metal of which the junction box is formed, and are bent inwardly so as to be generally in parallel to the plane of the base plate 12. Tabs 20 include elongate bolt holes or slots 22, which are aligned longitudinally with each other.

Referring again to FIG. 2, the base plate 12 includes a pair of square bolt holes 24 registering with bolt holes 22 in the tabs. Within each of the square holes 24 a square neck carriage bolt 26 has a head 25 press fit non-rotatably therein and has an externally threaded shank extending through spacer sleeve 30 and a bolt hole 22 in the registering tab 20. At its lower end each bolt 26 extends through a circular opening in one of a pair of opposed flanges 31 on a conventional mounting bracket 32 for a hanging appliance. A locking nut 28, such as for example an interference type nut, is threaded onto the lower end of each of the carriage bolts 26 to secure bracket 32 snugly against the underside of the box 10. Each sleeve 30 surrounds one of the carriage bolts 26 and extends from the inner surface of base plate 12 to the inner surface of a tab 20, thereby forming a reinforcement spacer or cylinder.

As shown in FIG. 1 and 2, the sidewall 14 of the junction box 10 further includes a pair of mounting holes 40 on one side. Wood screws 42 extend through mounting holes 40 and are screwed laterally into the joist 4 for mounting the junction box. With this mounting arrangement, the box may be mounted flush with the ceiling 6, as shown, or at any position relative to the ceiling, whether recessed or protruding, as desired.

Figure 3:
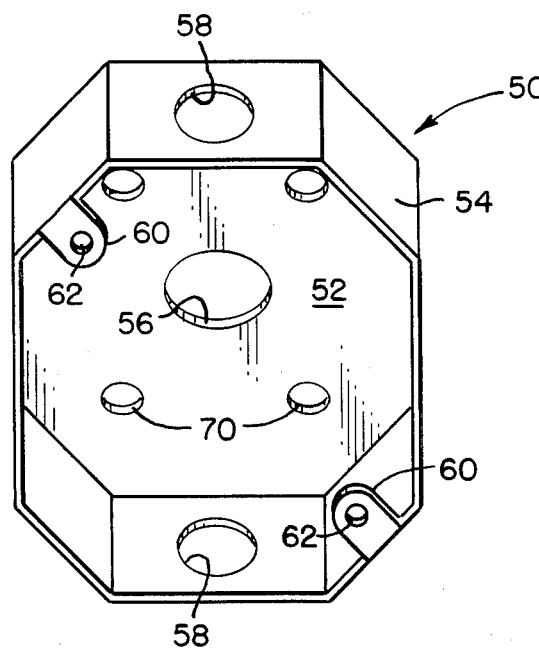
FIG. 3 is a perspective view showing the interior of a junction box of the prior art.

FIG. 3 shows a prior art junction box 50 and will be helpful as a point of reference from which to distinguish the junction box of this invention. Junction box 50, like junction box 10 is formed of a single piece and includes a base plate 52 and a peripheral depending sidewall 54. The base plate 12 includes a central aperture 56 for conduit or wiring, and the sidewall includes a plurality of conduit or wire apertures 58 around its periphery. The sidewall 54 includes a pair of inwardly extending tabs 60. The similarity of prior art junction box 50 with the junction box 10 of this invention ends at this point. Tabs 60, for example, include threaded bolt holes 62 into which bracket-mounting carriage bolts (not illustrated) are adapted to be threaded upwardly into the tabs 60 to support a bracket (e.g. bracket 32) directly from tabs 60. The junction box 50 further includes one or more mounting holes 70 in its base for accommodating vertically disposed screws (not illustrated) used to secure the top of box 50 flush against the underside of a ceiling or ceiling joist.

In the prior art arrangement of FIG. 3, whatever mechanical load is applied by carriage bolts to tabs 60 is borne only by the relatively insubstantial threaded connection of the carriage bolts in the thin tabs 60, and the portions of these tabs integral with the sidewall 54. The associated carriage bolts are not additionally supported by the base plate 52, and no other reinforcement is provided. In addition, with this mounting arrangement, the junction box necessarily hangs down from its mounting structure and is therefore not flush with the ceiling but protrudes from it.

By comparison, in the present invention the load on the carriage bolts 26 is supported by positive locking engagement of the carriage bolts and the base plate 12. The total tensile strength of the hanging system is dramatically increased because the forces are not concentrated on the tabs 20 but are distributed over the base plate of the box in the general area of the carriage bolt heads. The bolt holes or slots 22 in the tabs 20 are not threaded, and tabs 20 therefore do not in any way support bracket 32, but instead merely serve as guides for the carriage bolts 26, and supports for spacers 30. The reinforcing spacer sleeves 30 prevent undue bending of the tabs 20 and also permit the nuts 28 on carriage bolts 26 to be tightened down on the mounting bracket 32, thus providing greater rigidity and strength to the system. Furthermore, the lateral mounting arrangement provided by lag bolts 42 permits the underside of box 10 to be mounted flush with the ceiling, or to be recessed relatiee to it, as desired.

One of the advantages of using the spacer sleeves 30 is that, when used with bolts 26 that are threaded for substantial portions of their lengths, the sleeves 30 cover the threaded portions of the bolts within the box 10, thus preventing the bolt threads from damaging electrical wires in the box. In this connection, instead of using the spacers it would be possible to use bolts 26 which are threaded only adjacent their lower ends, and which present smooth peripheral surfaces within box 10. It is not necessary that these latter bolts have external shoulders which engage the upper surfaces of the tabs 20. It is necessary only that the associated nuts 28 hold the heads 25 of the bolts securely against the base plate 12, so that substantially the full weight of the appliance supported by bracket 32 will be transmitted to plate 12.

While this invention has been illustrated and described in connection with only certain embodiments thereof, it will be apparent that this application is intended to cover any such further modifications as may fall within the scope of one skilled in the art or the appended claims.

What is claimed is:

1. An electrical junction box for supporting a hanging load, said junction box including a base plate and a peripheral sidewall extending therefrom, said base and sidewall together forming a junction box cavity;
    said base plate defining a spaced plurality of base plate bolt holes adjacent said sidewall;
    said sidewall including a spaced plurality of inwardly extending tabs each defining a tab bolt hole in alignment with one of said base plate bolt holes; said sidewall further defining a plurality of mounting holes for side mounting of said junction box for a supporting structure; and
    a bolt extending through each of said base plate bolt holes and the tab bolt hole aligned therewith, and a lock nut engaged with each of said bolts for supporting said hanging load on said box.

2. An electrical junction box as defined in claim 1, further including a spacer sleeve surrounding each of said bolts between said base plate and said tabs.

3. An electrical junction box as defined in claim 1 in which said plurality of bolt holes is a pair of bolt holes, and said plurality of tabs is a pair of tabs, said pairs being at substantially opposite locations on said junction box.

4. An electrical junction box as defined in claim 1, in which said bolts have means thereon for preventing rotation of said bolts with respect to said base plate.

5. An electrical junction box as defined in claim 4 in which said base plate bolt holes are square, and said bolts are square necked carriage bolts.

6. An electrical junction box assembly for supporting from the underside thereof a bracket for a hanging load, said assembly including a junction box having a base plate and a peripheral sidewall extending downwardly therefrom, said base plate and sidewall together forming a junction box cavity open at its lower end and closed at its upper end by said base plate,
    said base plate defining a pair of base plate bolt holes at substantially opposite positions on said base plate and adjacent said sidewall;
    said sidewall including a pair of integral tabs extending transversely inwardly of said cavity adjacent the lower end thereof, and each defining a tab bolt hole in alignment with one of said base plate bolt holes; said sidewall further defining a plurality of mounting holes for side mounting of said junction box to a supporting structure;
    a bolt having a shank portion extending downwardly and slidably through each of said base plate bolt holes and the tab bolt hole aligned therewith, and having a head portion engaged with the upper surface of said base plate,
    a nut threadably engaged with the lower end of each of said bolts for supporting said bracket from the underside of said box, and
    a spacer sleeve surrounding each of said bolts between said base plate and said tabs, respectively.

7. An electrical junction box as defined in claim 6 in which said bolts are secured against rotation with respect to said base plate.

8. An electrical junction box as defined in claim 7 in which said base plate bolt holes are square, and said bolts are square necked carriage bolts.

9. An electrical junction box assembly for supporting from the underside thereof a bracket for a hanging load, said assembly including a junction box having a base plate and a peripheral sidewall extending downwardly therefrom, said base plate and sidewall together forming a junction box cavity open at its lower end, and closed at its upper end by said base plate,
    said base plate defining a pair of base palte bolt holes at substantially opposite positions on said base plate and adjacent said sidewall,
    a pair of bolts each having a shank portion extending downwardly and slidably adjacent its upper end through one of said base plate bolt holes, and slidably adjacent its lower end through a registering opening in said bracket,
    a nut threadably engaged with the lower end of each of said bolts beneath said bracket for supporting said bracket from the underside of said box, and
    a spacer sleeve surrounding each of said bolts between said base plate and said bracket.

10. An electrical junction box as defined in claim 9, wherein said bolts extend slidably adjacent their lower ends through openings in a pair of tabs which are integral with and project inwardly from the sidewall of said box adjacent its lower end.

* * * * *

UNITED STATES PATENT AND TRADEMARK OFFICE
Certificate

Patent No. 4,788,383            Patented: November 29, 198

On petition requesting issuance of a certificate for correction of inventorship pursuant to 35 U.S.C. 25( it has been found that the above-identified patent, through error and without any deceptive inten improperly sets forth the inventorship. Accordingly, it is hereby certified that the correct inventorshi of this patent is:
Gregory W. Caison and David G. Wilson.

Signed and Sealed this Twenty-eighth Day of August 1990.

LEO P. PICARI

*Supervisory Patent Examine*
*Art Unit 21*